Feb. 19, 1929. Re. 17,217

D. D. BURCH

CASING SHOE

Original Filed Feb. 25, 1926

INVENTOR.
Donald D. Burch.
BY
Townsend, Loftus & Abbett
ATTORNEYS.

Reissued Feb. 19, 1929. Re. 17,217

UNITED STATES PATENT OFFICE.

DONALD D. BURCH, OF EARLSBORO CAMP, OKLAHOMA.

CASING SHOE.

Original No. 1,603,447, dated October 19, 1926, Serial No. 90,575, filed February 25, 1926. Application for reissue filed February 25, 1928. Serial No. 257,041.

This invention relates to casing shoes and more particularly to a casing shoe intended for use in connection with well casings which are to be cemented in position or which, because of their weight, must have a portion of the weight floated as they are lowered into the well.

An important object of the invention is to provide a device of this character which may be relatively cheaply constructed and which may be readily attached to the casing.

A further and more specific object of the invention is to provide means for plugging the shoe whereby liquids or semi-liquids may be forced from the interior of the shoe to the exterior thereof so that they will arise about the casing, but these liquids may not return to the interior of the shoe.

These and other objects I attain by the construction shown in the accompanying drawing, wherein for the purpose of illustration is shown a preferred embodiment of my invention and wherein:—

Figure 1:
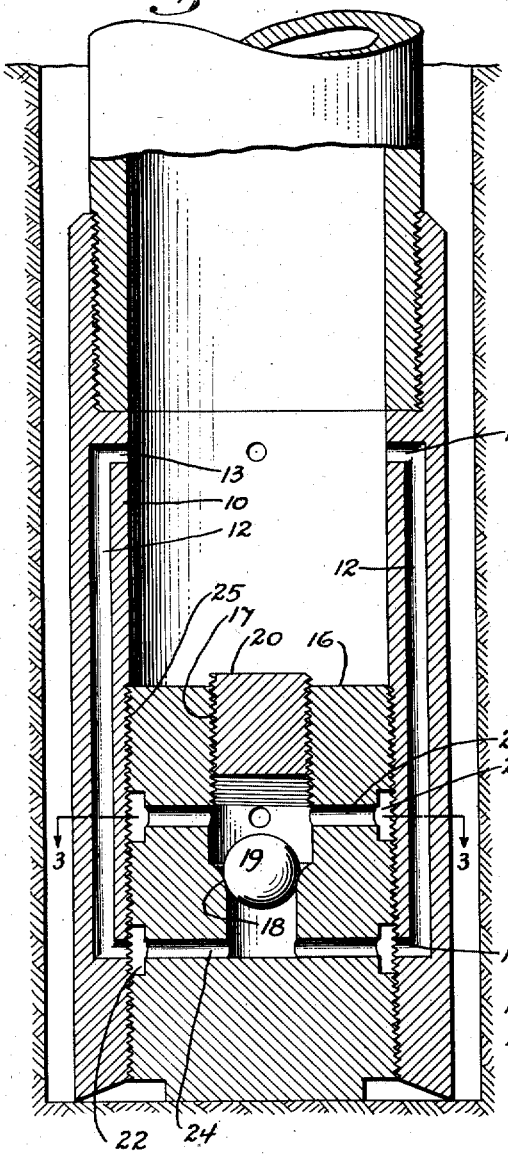
Figure 1 is a vertical sectional view through a casing shoe constructed in accordance with my invention showing the same in position upon the bottom of the well.
Figure 2:
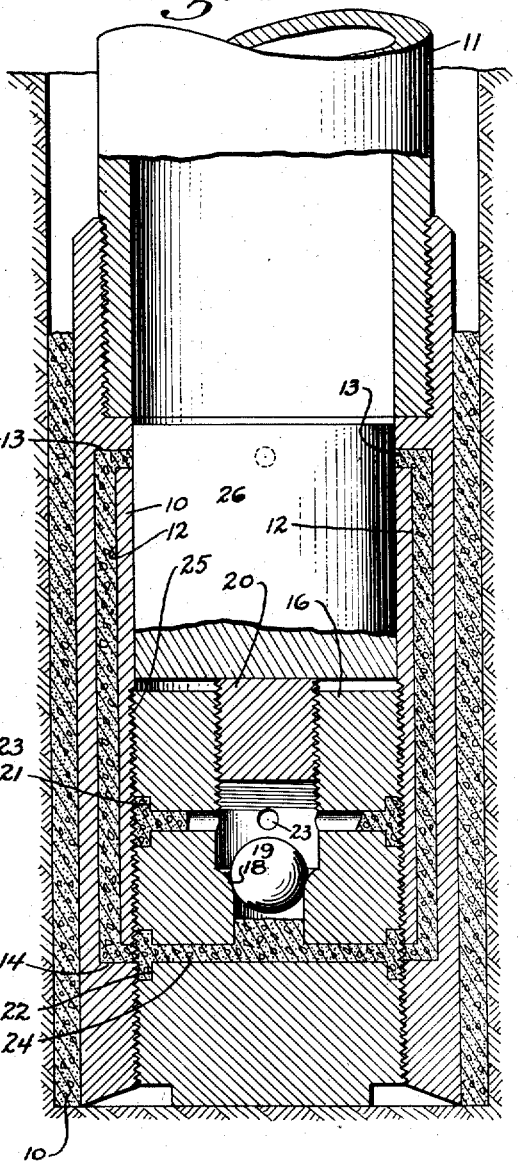
Figure 2 is a similar section showing the effect of introduction of cement and the plug for sealing the ports 12.
Figure 3:
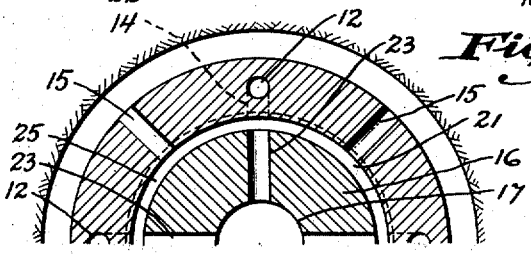
Figure 3 is a section on the line 3—3 of Figure 1.

Referring now more particularly to the drawings, the numeral 10 indicates a casing shoe adapted to be engaged with the lower end of a casing 11 and having in the walls thereof vertically extending ports 12, the upper ends of which open through the inner wall of the casing shoe at the upper and lower ends thereof, as at 13 and 14. Intermediate the upper and lower ends of the ports 12, the walls of the shoe have formed therethrough other ports 15 which are circumferentially spaced from the ports 12.

A plug 16 is provided having a longitudinal bore 17 terminating at its lower end short of the lower end of the plug and at its upper end opening through the upper end of the plug. Adjacent its lower end, the bore is reduced to provide an upwardly facing valve seat 18 for a ball valve 19. The upper end of the bore is sealed by a plug 20, so as to form a valve chamber within the plug between the valve seat 18 and the plug 20, within which chamber the ball valve 19 is freely disposed. The outer face of the plug is provided with vertically spaced circumferential grooves 21, 22, the groove 21 being connected by ports 23 with the valve chamber intermediate the plug 20 and the seat 18 while the groove 22 is connected by ports 24 with the lower end of the bore 17. The grooves 21 and 22 are spaced apart a distance equal to the spacing between the ports 15 and the lower end 14 of the ports 12. The exterior of the plug 16 and the interior of the shoe have coacting screw-threads 25. When the plug is properly seated, the grooves 21, 22 align with the ports 15 and the ends 14 of the ports 12.

It will be obvious that when a casing having a shoe provided with a plug of this character is lowered into the well, fluids within the well cannot enter the casing for the reason that these fluids, as they enter through the ports 15, grooves 21 and ports 23 will exert a pressure, forcing the valve 19 into position upon its seat. Therefore, the plug serves to seal against the admission of fluids to the lower end of the casing and the casing may be lowered into the well and partially supported by the buoyancy of its submerged portion. If this buoyancy increases to too great an extent, it may be counteracted by admitting water or other material to the interior of the casing from the upper end thereof. Where the casing, after arriving in proper position, is to be cemented, the fluid inserted to counteract the buoyancy would, of course, be the cement which must be employed. In cementing a well, the casing is lowered into position, the desired amount of cement placed in the casing and a follower plug 26 placed on top of the cement. Pump pressure is then exerted against the follower plug 26 with the result that this plug moves downwardly in the casing, forcing the cement before it through the ports 12 to the grooves 22 and ports 24, displacing the valve 19 so that the cement may pass through the ports 23, grooves 21, ports 15 to the exterior of the casing. When the plug 26 arrives at the lower end of its travel, it will cover the upper ends 13 of the ports 12, sealing the same and giving notice by the increased resistance to operation of the pump that the cement has been completely removed. Pump pressure may then be entirely removed and the check ball 19 will effectually prevent return of the cement to the casing. The plug 16 is preferably formed of some readily displaceable material and the plug 26 is similarly formed so that these plugs may be drilled out of the casing after the cement has set.

It is obvious that by use of a valve structure that I have defined, which includes a seat within the plug and a ball valve, it is not necessary to employ springs or other means to seat the ball to prevent fluid from the exterior of the casing from passing through the plug into the casing. This insures that the ball will at all times properly operate.

Since the construction hereinbefore set forth is capable of a certain range of change and modification without materially departing from the spirit of the invention, I do not limit myself to such specific structure except as hereinafter claimed.

I claim:—

1. A casing shoe for the purpose described having a plug fitted in the lower end thereof, the plug having a bore provided intermediate its ends with a valve seat, the ends of the bore being sealed, a valve for coaction with said seat, ports opening through the wall of the shoe and communicating with said bore at one side of the valve and ports connecting the interior of the shoe above the plug with the bore at the opposite side of the valve.

2. A casing shoe for the purpose described having a plug fitted in the lower end thereof, the plug having a bore provided intermediate its ends with a valve seat, the ends of the bore being sealed, a valve for coaction with said seat, ports opening through the wall of the shoe and communicating with said bore at one side of the valve, ports connecting the interior of the shoe above the plug with the bore at the opposite side of the valve and a second plug fitting the bore of the shoe and when supported from the first named plug sealing the ends of the last named ports which communicate with the interior of the shoe.

3. A casing shoe for the purpose described having a plug fitted in the lower end thereof, the plug having a bore provided intermediate its ends with a valve seat, the ends of the bore being sealed, a valve for coaction with said seat, ports opening through the wall of the shoe and communicating with said bore at one side of the valve, and ports connecting the interior of the shoe above the plug with the bore at the opposite side of the valve, said plug being of readily displaceable material.

4. In combination with a casing shoe, a plug fitted in the lower end of the shoe, said plug having a longitudinal bore sealed at its upper and lower ends, the bore being provided intermediate its ends with an upwardly facing valve seat and a valve coacting with said seat, the periphery of the plug having channels formed therein, ports connecting one of said channels with the bore above and the other of the channels with the bore below the valve seat, ports extending through the side wall of the shoe and communicating with the first named channel and ports in the wall of the shoe communicating at their lower ends with the last named channel and at their upper ends with the interior of the shoe above the plug.

5. In combination with a casing shoe, a plug fitted in the lower end of the shoe, said plug having a longitudinal bore sealed at its upper and lower ends, the bore being provided intermediate its ends with an upwardly facing valve seat and a valve coacting with said seat, the periphery of the plug having channels formed therein, ports connecting one of said channels with the bore above and the other of the channels with the bore below the valve seat, ports extending through the side wall of the shoe and communicating with the first named channel, ports in the wall of the shoe communicating at their lower ends with the last named channel and at their upper ends with the interior of the shoe above the plug and a second plug of substantially the same diameter as the internal diameter of the shoe and of a length greater than the distance between the upper end of the first named plug and the upper ends of the last named ports.

6. In combination with a casing shoe, a plug fitted in the lower end of the shoe, said plug having a longitudinal bore sealed at its upper and lower ends, the bore being provided intermediate its ends with an upwardly facing valve seat and a valve coacting with said seat, the periphery of the plug having channels formed therein, ports connecting one of said channels with the bore above and the other of the channels with the bore below the valve seats, ports extending through the side wall of the shoe and communicating with the first named channel, ports in the wall of the shoe communicating at their lower ends with the last named channel and at their upper ends with the interior of the shoe above the plug and a second plug of substantially the same diameter as the internal diameter of the shoe and of a length greater than the distance between the upper end of the first named plug and the upper ends of the last named ports, said plugs being of readily displaceable material removable from the shoe by drilling.

7. In combination with a casing shoe, a plug fitted in the lower end of the shoe, said plug having a longitudinal bore sealed at its upper and lower ends, the bore being provided intermediate its ends with an upwardly facing valve seat and a valve coacting with said seat, the periphery of the plug having channels formed therein, ports connecting one of said channels with the bore above and the other of the channels with the bore below the valve seat, ports extending through the side wall of the shoe and communicating with the first named channel and ports in the wall of the shoe communicating at their lower ends with the last named channel and at their upper ends with the interior of the shoe above the plug, said plug being of material removable from the shoe by drilling.

8. A casing shoe for the purpose described having a plug fitted in its lower end, the plug having an interior valve chamber sealed at the top and bottom and provided intermediate of its ends with a valve seat, a gravity closable valve coacting with said seat, fluid conducting means extending between the interior of the shoe above the plug and the valve chamber and communicating with the latter at one side of the valve, and fluid conducting means communicating with the exterior of the shoe and with the valve chamber at the opposite side of the valve seat.

9. A casing shoe for the purpose described having a plug fitted within it, the plug being provided with an interior valve chamber sealed at the top and bottom and provided intermediate of its ends with a valve seat, fluid conducting means extending between the interior of the shoe above the plug and communicating with the valve chamber below the valve seat, and fluid conducting means extending from the valve chamber above the valve seat and communicating with the exterior of the shoe.

10. A casing shoe for the purpose described having a plug fitted within the casing, said plug being provided with a bore sealed at its upper and lower ends and provided intermediate its ends with a valve seat, a ball valve arranged within the valve chamber and cooperating with the said seat, fluid conducting means extending between the interior of the shoe above the plug to the said bore and communicating with the latter below the valve seat to permit fluid to be discharged from the interior of the shoe above the plug through the bore, and fluid conducting means extending from the bore above the valve seat to the exterior of the shoe.

DONALD D. BURCH.